J. H. CARY.
HULLING AND CLEANING MACHINE.
APPLICATION FILED JUNE 9, 1914. RENEWED JULY 6, 1916.
1,220,952.
Patented Mar. 27, 1917.
2 SHEETS—SHEET 1.
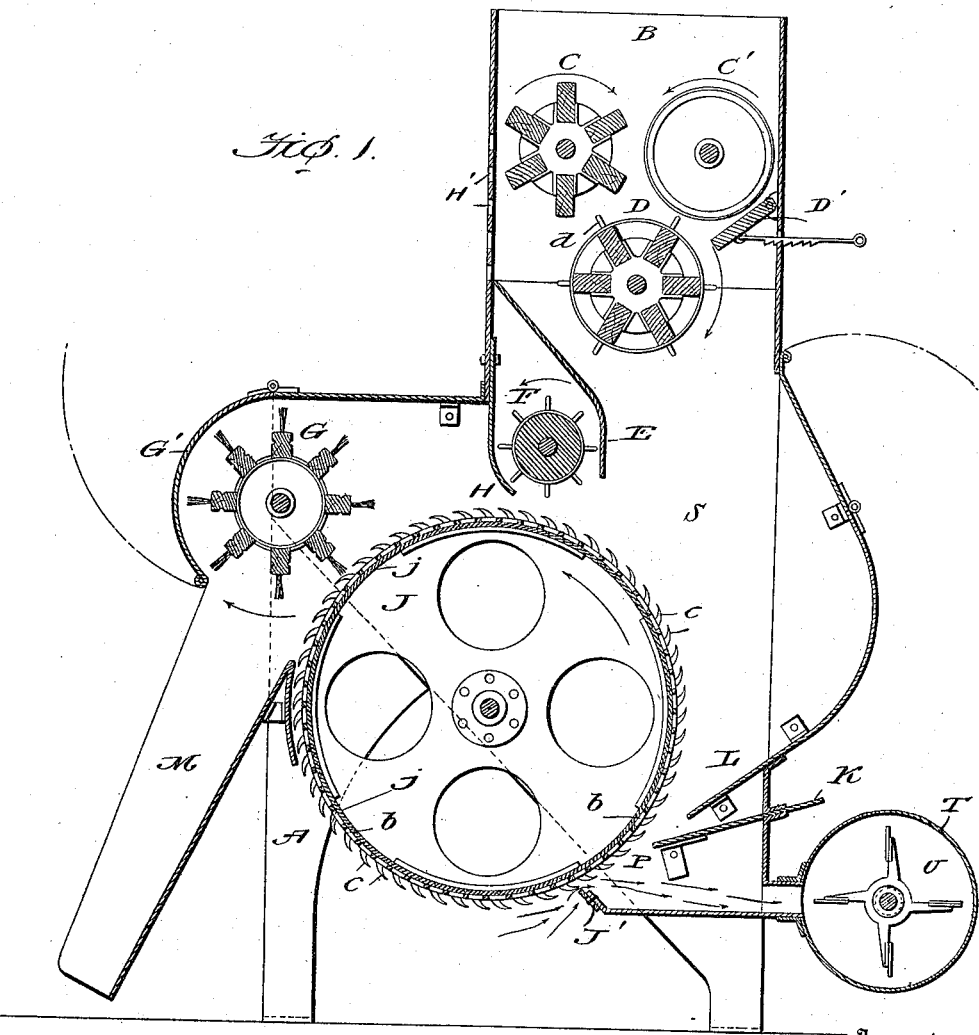
Witnesses
Inventor
James H. Cary.
By T. Walter Fowler
Attorney

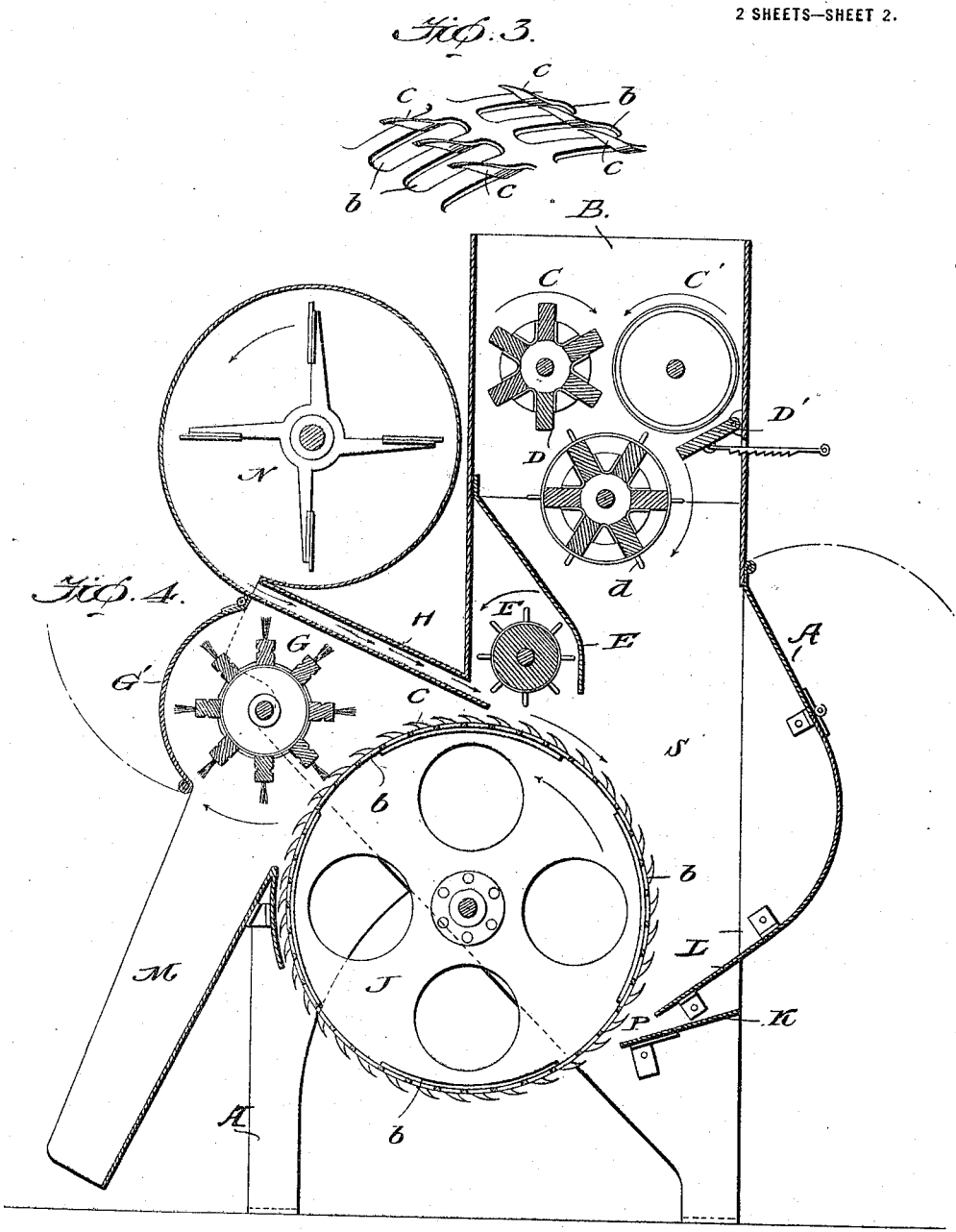

and useful Improvements in Hulling and Clean-# UNITED STATES PATENT OFFICE.

JAMES H. CARY, OF MEMPHIS, TENNESSEE.

HULLING AND CLEANING MACHINE.

1,220,952. Specification of Letters Patent. Patented Mar. 27, 1917.

Application filed June 9, 1914, Serial No. 844,056. Renewed July 6, 1916. Serial No. 107,876.

*To all whom it may concern:*

Be it known that I, JAMES H. CARY, a citizen of the United States, residing at Memphis, in the county of Shelby and State of Tennessee, have invented certain new and useful Improvements in Hulling and Cleaning Machines, of which the following is a specification.

My invention relates to improvements in apparatus for separating foreign matter from seed cotton and saving the latter in a condition for commercial use. Specifically, the invention has reference to an improved means for hulling and cleaning seed cotton so that the same may be fed to the cotton gin in the best possible condition. The apparatus may also be used for treating trashy seed cotton, especially boll-screenings, and for separating the dry boll from cotton, and for such similar purposes as the apparatus may be found useful.

A leading object of the invention is to effect separation of the foreign matter from the cotton with as little mixing, tangling, or disintegration of the cotton as possible, and to this end, my invention consists of the parts, and the constructions, arrangements and combinations of parts which I will hereinafter describe and claim.

In the accompanying drawings forming part of this specification and in which similar reference characters indicate like parts in the several views;

Figure 1 is a vertical longitudinal sectional view of a cotton hulling and cleaning machine embodying the salient features of my invention.

Fig. 2 is a perspective view of a portion of a knocker roll.

Fig. 3 is a perspective view of a fragment of a screen drum or cylinder.

Fig. 4 is a vertical longitudinal sectional view of a machine of modified form.

In the accompanying drawings, A, represents a framework of suitable design, size and construction, in the upper portion of which is arranged or provided a hopper or feed box, B, into which the material to be treated is fed in any desired manner. Within the upper portion of the frame and at one side of the center thereof is a fluted feed roll, C, and opposing this roll, at the opposite side of the center of the frame, is a roll, C', which, preferably, is covered with sheet metal or otherwise formed with a smooth surface to prevent the cotton from wadding or from choking between the rolls, and to insure a regular and even feed to the cotton, it being understood that the smooth-surface roll and the fluted-roll work in conjunction and feed the cotton to an underlying roll, D. This latter roll lies immediately below the space between the rolls, C and C', and it is sometimes designated as a disintegrating roll; it receives the cotton from the upper rolls and gives to said cotton a downward thrust through a free air space, S, with which the frame is provided.

Controlling the inlet to the space, S, through which the cotton is fed by the joint action of the rolls, C' and D, and mounted below the roll, C', and inclined downwardly into the frame, is an adjustable baffle-plate, D', the purpose of which is to hold the cotton into the path of the roll, D, so as to permit the latter to break the bolls of unopen cotton which are held in position by the baffle. The baffle may be spring-actuated or yieldingly mounted in any suitable manner, and the roll, D, has its periphery provided with teeth, d, which may be in the form of staples or other projections, which assist in feeding the cotton into the free air space before mentioned.

At the side of the machine opposite the one to which the baffle-plate, D', is secured, is a deflector or shield, E, which extends downwardly at an angle into the body of the frame and below the roll, D, said deflector or shield serving as a housing or covering for a knocker roll, F, which is positioned directly over the cylindrical screen or drum, J, which I will hereinafter describe, said knocker roll being mounted in an air-passage which communicates with the free air space, S, in the back of the frame and into which space the cotton is fed by the feed rolls, as before mentioned. By reference to Fig. 2, it will be seen that the knocker roll has its periphery armed or provided with a series of projections which, preferably, are in the form of staples, a, or hooks or like parts, having openings through them and having rounded outer surfaces. The purpose of this construction is to give a free vent to the air which passes the knocker roll and over the top of the screen cylinder or drum, J, which is possible because of the projections having open centers, and to provide a rounded smooth surface which prevents that tearing or mutilation of the cotton which is common when spikes or other pointed teeth or projections are formed on the surface of the knocker roll.

At one side, the frame is extended to form a bearing and housing for a brush-roll, G, said frame being provided with a protecting shield, G', for said roll, and said frame having in the top of said extension an air inlet, H, Fig. 4, to which air may be delivered from any suitable source, under pressure, or otherwise, as desired.

The extension of the frame is also provided with a chute, M, through which the clean cotton may be delivered by the brush-roll, in the manner well known in this art.

At the back of the frame near the lower end of the air space, S, are provided the deflectors, K and L, the latter being positioned above the former and both deflectors being, in practice, adjustable so as to control the width of the passage between the forward ends of the deflectors and the periphery of the screen cylinder, through which the separated foreign matter may pass to any suitable receiver, not shown.

In Fig. 4, the machine is supplied with a blast fan, N, at the front of the casing for forcing a draft of air through the passage between the doffing roll and cylinder, J, and through the free air space, S. In Fig. 1, the fan is of the suction type and is at the rear of the casing and its inlet end communicates with the intake passage, P, leading into a fan casing, T, into which said separated foreign material is drawn by the fan, U, and discharged from the outlet thereof in the manner well known in this art. In Fig. 4, the deflectors, K, and L, are separated from each other to form a space which is open at front and rear and through this space debris or rejected matter may be discharged, over the inclined deflector, K, by the centrifugal action of the toothed cylinder, J. In practice, the width of the inlet to the aforesaid space may be controlled by the adjustment of one deflector relatively to the other. If desired, a flexible medium, J', may be provided at the bottom of the free air space and contiguous to the intake, P, to cut off the air at this point and insure the delivery of the same into the intake.

A leading feature of my invention resides in the construction of the screen cylinder, J. This cylinder is of large diameter and I prefer to construct it of sheet metal in which are punched or otherwise made rows of slots, b, which extend in the direction of the circumference of the roller. The slots are preferably made by punching out portions of the metal and leaving a portion of the metal of saw-tooth form attached to one wall on each slot, and thence bending this attached portion at right-angles so that in the completed drum, the attached portions are tapering and form substantially hook-shaped teeth or projections, c, which extend in rows over the periphery of the drum and have their extremities pointing in the direction of the rotation of said drum. The drum rotates in a direction opposite to the rotation of the knocker roll and to the direction of the current of air passing between said roll and the drum, and the teeth or projections, c, on the drum engage and carry the cotton against the action of the knocker roll and the air current, around to the point where the cotton may be engaged by the brush roll, G, which has the function of removing the cotton from the teeth, c, of the screen cylinder and delivering the cotton into the discharge chute, M.

By forming the drum or cylinder, J, of foraminous material, and with openings of substantial size, any dirt, or foreign matter associated with the cotton may pass to the interior of the cylinder and thus be separated from the cotton, said material being in turn delivered through the screen material at the bottom of the cylinder and into any suitable receiver, not shown.

It will be observed from the foregoing description that the teeth on the cylinder are integral with the material on said cylinder and that the teeth are struck out from the body of the metal with which the periphery of the cylinder is composed, thus simplifying the construction and avoiding the use of separate teeth or rows of teeth separately attached around the circumference of the cylinder, and that the foraminous material of which the cylinder is composed provides for a complete screening or separation of the foreign matter, thus increasing the commercial value of the cotton delivered through the discharge chute, M. The difference between the two types of machines shown is as follows:

In Fig. 1, the fan is a suction fan placed at the back of the machine and in this case air is drawn into the casing through perforations, H', in the side thereof, the air in this case passing down over the shield or housing, E, and through the free air space and finally into the fan casing. In this case I modify the construction of the cylinder, J, by placing an imperforate lining, j, close around the inside of the cylinder. In other words, the cylinder has a rim of imperforate material and over this is snugly placed the perforated rim with its outstanding hook-shaped projection. Accordingly, the air does not pass through the cylinder when using the construction of Fig. 1, but the cleaning and separating functions are performed by the air passing around the cylinder and working in conjunction with the other parts of the machine.

In Fig. 4, the internal imperforate lining is omitted from the cylinder and accordingly any dirt or foreign matter associated with the cotton is permitted to pass to the interior of the cylinder and be separated from the cotton, said foreign material being in turn delivered through the screen at the bottom as before described.

It will be further observed that the screen cylinder is not hooded except by the main casing of the machine. This is a decided advantage over a solid drum or cylinder in the matter of separation.

The operation of the machine will be fully understood from the foregoing description and it is apparent that the construction and arrangement may be modified within reasonable limits without destroying the function of the several novel parts and the hulling and cleaning effect the said parts have upon the material being treated.

Having thus described my invention what I claim as new and desire to secure by Letters Patent is:—

1. In a cotton hulling and cleaning machine, the combination with a frame having a blast inlet and a cylinder or drum having its periphery armed with teeth which extend into the face of the air blast and move toward the same, of a knocker roll mounted within the frame adjacent said cylinder or drum and having its periphery armed with projections having open centers to give free vent to the air current admitted through said inlet.

2. In a cotton hulling and cleaning machine, the combination with a frame having a blast inlet, and a cylinder or drum having its periphery armed with teeth which extend into the face of the air blast and move toward the same, of a knocker roll mounted within the frame adjacent said cylinder or drum, and staples fixed in the periphery of said rollers having open centers to give free vent to the air current admitted through said inlet, said staples having rounded outer ends.

3. In a cottom hulling and cleaning machine, the combination with a frame, a cylinder mounted therein having rows of teeth on its periphery, and a doffing roller, of a pair of feed rolls mounted in the frame, one of said rolls having a fluted surface and the other roll having a smooth surface, a disintegrating roll journaled below said pair of rolls, and a baffle-plate adjustably mounted below one of the first-named rolls and controlling the space between the same and the disintegrating roll and adapted to hold the material into the range of action of said disintegrating roll.

4. In a machine of the character described, the combination of a frame having an air inlet at one side and a free air space at the opposite side; a screen cylinder having rows of teeth on its periphery; a doffing roller mounted in the inlet end of the air passage above said cylinder; feed rollers adapted to feed material to the cylinder; a cleaning roll for removing separated material from the teeth of the cylinder; baffles at the lower end of the free air space and controlling the same; and an air cut-off adjacent the outlet of the free air space.

In testimony whereof I affix my signature in presence of two witnesses.

JAMES H. CARY.

Witnesses:
C. C. STEVENS,
BEN CARY.

Copies of this patent may be obtained for five cents each, by addressing the "Commissioner of Patents, Washington, D. C."